United States Patent [19]
Krahnke et al.

[11] Patent Number: 5,208,300
[45] Date of Patent: May 4, 1993

[54] SOLUTION-STABLE, MOISTURE-CURABLE SILICONE PRESSURE SENSITIVE ADHESIVES

[75] Inventors: Robert H. Krahnke; Shawn K. Mealey; William J. Schoenherr, all of Midland, Mich.

[73] Assignee: Dow Corning Corporation, Midland, Mich.

[21] Appl. No.: 748,477

[22] Filed: Aug. 22, 1991

[51] Int. Cl.$^5$ .......................... C08F 283/12
[52] U.S. Cl. .................. 525/474; 525/477; 528/17
[58] Field of Search .......... 528/17; 525/477, 474

[56] References Cited

U.S. PATENT DOCUMENTS

| | | | |
|---|---|---|---|
| 4,143,088 | 3/1979 | Faire et al. | 525/477 |
| 4,309,520 | 1/1982 | Blizzard | 525/477 |
| 4,591,622 | 5/1986 | Blizzard et al. | 525/477 |
| 4,847,400 | 7/1989 | Krahnke et al. | 528/34 |
| 4,962,174 | 10/1990 | Bilgrien et al. | 525/474 |
| 5,091,484 | 2/1992 | Colas et al. | 525/477 |

FOREIGN PATENT DOCUMENTS

| | | |
|---|---|---|
| 0307098A2 | 8/1988 | European Pat. Off. . |
| 0360516A2 | 9/1989 | European Pat. Off. . |
| 0380875A2 | 12/1989 | European Pat. Off. . |
| 2345491 | 3/1976 | France . |

OTHER PUBLICATIONS

Central Patents Index Basics Abstract Journal, Section A Derwent Publications 1985; May 22, 1985.

*Primary Examiner*—John C. Bleutge
*Assistant Examiner*—Margaret W. Gleen
*Attorney, Agent, or Firm*—George A. Grindahl

[57] ABSTRACT

Silicone pressure sensitive adhesive compositions which are stable in the absence of moisture but which cure in the presence of moisture comprise an adhesive component which bears alkoxy radical-containing curing radicals and, optionally, a catalyst to accelerate the reaction of moisture with the alkoxy radicals to form siloxane bonds. Curing provides adhesives ranging from pressure sensitive adhesives having improved properties to permanent adhesives. The adhesives are useful for adhering an object to a surface and thereafter improving the bond between the object and the surface by exposure to moisture.

10 Claims, No Drawings

SOLUTION-STABLE, MOISTURE-CURABLE SILICONE PRESSURE SENSITIVE ADHESIVES

BACKGROUND OF THE INVENTION

The present invention relates to solvent-based compositions which provide silicone pressure sensitive adhesives, hereinafter also referred to as SPSAs, which are stable in the absence of moisture and which cure by the action of ambient moisture, and to a method for their preparation. In a preferred embodiment the present invention relates to SPSA compositions which cure to a permanent adhesive which is useful as a structural adhesive.

By the term "silicone pressure sensitive adhesive" it is meant an adhesive comprising one or more siloxane components and possessing sufficient tack and cohesive strength so that it can be adhered with mild pressure to a clean stainless steel substrate and then removed therefrom and adhered to the same or another clean substrate. By the term "permanent adhesive" it is meant an adhesive that bonds to a clean substrate and cannot be so removed and thereafter readhered.

At the present time all commercial SPSA compositions are designed for the relatively low strength bonding of surfaces, such as electrical insulating tapes, medical tapes and devices and high temperature masking tapes. These commercial SPSA compositions are also designed to possess their ultimate adhesive properties when first applied.

However, there is a need for a SPSA which will provide higher bonding strengths and/or which will develop additional adhesive properties, such as resistance to flow or long term durability, after being applied.

Silicone structural glazing of curtainwall panels represents one of those needs. Durable structural glazing is currently done with silicone sealants in a multi-step, labor-intensive, time-consuming process. Significant improvements in the structural glazing process could be realized if a SPSA were used in place of the silicone sealant in the current process.

Unfortunately, standard SPSAs are not completely suitable for structural glazing applications because of their inherent flowability, albeit slow in the recently improved SPSAs, under sustained stress. Under the sustained stress of gravity the heavy glass panel that is currently used in structural glazing, if not further supported, would eventually experience shear failure of a SPSA bond. A SPSA that cures to a non-shearing adhesive having high adhesive strength would be very beneficial in this and other applications.

Currie et al., U.S. Pat. No. 2,814,601. disclose SPSA compositions which are useful for bonding silicone rubber to metal, such as aluminum, and which will cure to a permanent bond adhesive at room temperature.

Blizzard et al., U.S. Pat. No. 4,613,534 claims a permanent-bond adhesive for bonding coated fabric that is used in the construction of air- or tension-supported structures.

However, the compositions of Currie et al. and of Blizzard et al. cure spontaneously at room temperature when mixed, even in the absence of moisture, and therefore cannot be mixed and stored before use but, rather, must be used shortly after being prepared.

In a co-pending application for U.S. patent, titled "MOISTURE-CURABLE SILICONE PRESSURE SENSITIVE ADHESIVES", filed on even date herewith and assigned to the assignee of this application, there is disclosed and claimed a moisture-curable SPSA composition. However, if not used promptly, such as within a few days after being prepared, the SPSA composition has a tendency to gel.

BRIEF SUMMARY OF THE INVENTION

It is an object of this invention to provide new SPSAs, and compositions for their preparation, which experience an increase in one or more adhesive properties when exposed to moisture. It is another object of this invention to provide compositions which provide SPSAs which will become a permanent adhesive in the presence of ambient moisture. It is a further object of this invention to provide a SPSA composition which can be prepared and stored for long periods of time and can be used to provide a moisture-curable SPSA. when desired, without further mixing or processing. It is a preferred object of this invention to provide new SPSAs, and compositions for their preparation, which are suitable for structural glazing applications. It is a related object of this invention to provide a process for preparing the compositions of this invention.

These objects, and others which will become apparent to one of ordinary skill in the pressure sensitive adhesive art upon considering the following disclosure and appended claims, are obtained by the present invention which, briefly stated, comprise preparing a silanol-free silicone pressure sensitive adhesive, suitably substituted with silicon-bonded curing radicals, which will cure via the curing radicals to a stronger, and preferably permanent, adhesive when exposed to ambient moisture. A catalyst is advantageously included to promote the moisture-initiated reaction of the silicon-bonded curing radicals to form siloxane bonds. In preferred compositions of this invention the silicon-bonded curing radicals bear trimethoxysilylalkyl moieties and the catalyst is an organic titanate.

The method of this invention comprises modifying a SPSA composition so that it bears the necessary curing radicals or preparing a SPSA composition from components which bear the necessary curing radicals, and capping any excess silanol radicals in the SPSA component.

The compositions of this invention are useful for adhering an object to a substate without the need for means to hold the object in place while the adhesive cures. The solvent-containing compositions can be stored for long periods of time in the absence of moisture and then used to provide a moisture-curable SPSA.

DETAILED DESCRIPTION OF THE INVENTION

In a first embodiment the present invention relates to a composition comprising a silanol-free silicone pressure sensitive adhesive component bearing curing radicals having the formula $R_b(OR')_{3-b}SiZ-$ and capping radicals having the formula $R_3SiO-$ wherein Z denotes a divalent radical linking the silicon atom of the curing radical to a silicon atom of the silicone pressure sensitive adhesive component.

R denotes a monovalent hydrocarbon radical.

R' denotes an alkyl or alkoxyalkyl radical, and the subscript b has a value of 0 or 1;

all other silicon-bonded radicals of the silicone pressure sensitive adhesive component being selected from the group consisting of divalent oxygen atoms linking silicon atoms, hydrogen atoms and monovalent hydrocarbon radicals.

Curing radicals having the formula $R_b(OR')_{3-b}SiZ$— are present in the SPSA component to provide a way to improve one or more physical properties of the SPSA. In the curing radicals R, when present, can be any monovalent hydrocarbon radical having, for example, from 1 to 10, preferably 1 to 6. carbon atoms, such as lower alkyl radicals exemplified by methyl, ethyl, propyl and isopropyl; alkenyl, such as vinyl; and aryl, such as phenyl, To obtain maximum curing rates for the adhesive compositions of this invention it is preferred that the value of subscript b in the curing radical formula is zero: however, when b=1, R is preferably the methyl radical.

R' denotes any alkyl or alkoxyalkyl radical, preferably having less than 5 carbon atoms, such as methyl, ethyl, isopropyl, methoxyethyl or ethoxyethyl, R' is preferably methyl.

Z denotes any divalent radical which durably links the silicon atom of the curing radical to a silicon atom of the SPSA so that (a) the silicon atom of the curing radical is not removed from the SPSA component during moisture-curing of the SPSA and (b) the moisture-curing reaction is not adversely limited. Z has no other known requirements.

Z is typically selected from the types of divalent radicals that are used to link silicon atoms in a hydrolytically stable manner and include, for example, oxygen; hydrocarbon, such as alkylene, exemplified by ethylene, propylene and isobutylene, and phenylene; hydrocarbon containing one or more hetero atoms selected from oxygen, nitrogen and sulfur, such as ether-, thioether-, ester- or amide-containing hydrocarbon; siloxane, such as polydimethylsiloxane; and combinations thereof.

Preferably, Z is selected from the group of radicals having the formula $-(C_2H_4SiMe_2)_x(OSiMe_2)_yD-$. Herein Me denotes methyl and D denotes oxygen or $C_2H_4$. The value of the subscript x can range from 0 to 2, preferably 1. and the subscript y can range from 0 to 6. preferably 0 or 1, each both inclusive, and the sum of x+y is zero or more.

Preferred Z linkages include silhydrocarbonsiloxane linkages, such as $-(OSiMe_2)CH_2CH_2-$, $-(CH_2,CH_2SiMe_2)O-$, $-(CH_2CH_2SiMe_2)(OSiMe_2)CH_2CH_2-$, and $-(CH_2CH_2SiMe_2)(OSiMe_2)O-13$, silhydrocarbon linkages, such as $-(CH_2CH_2SiMe_2)CH_2CH_2-$ and $-CH_2CH_2-$; and siloxane linkages, such as $-(OSiMe_2)O-$ and $-O-$. Most preferably Z contains an ethylene linkage bonded to the silicon atom bearing OR' radicals.

Specific examples of suitable curing radicals include, but are not limited to $(MeO)_3SiCH_2CH_2-$, $(MeO)_3SiO-$, $Me(MeO)_2SiO-$, $(MeO)_3SiCH_2CH_2SiMe_2CH_2CH_2SiMe_2O-$, $(MeO)_3SiCH_2CH_2SiMe_2O-$, $(MeO)_3SiCH_2CH_2SiMe_2OSiMe_2O-$ and $(MeO)_3SiCH_2CH_2SiMe_2OSiMe_2CH_2CH_2-$.

Herein the ethylene radical is sometimes written as $C_2H_4$ to indicate the isomeric mixture of $CH_2CH_2$ and $CH_3CH$ linkages that are obtained when a hydrosilylation reaction between a silicon-bonded vinyl radical and a silicon-bonded hydrogen atom occurs. For example, the formula $(MeO)_3SiC_2H_4SiMe_2O-$ is to be construed as encompassing $(MeO)_3SiCH_2CH_2SiMe_2O-$ and/or $(MeO)_3SiCH(CH_3)SiMe_2O-$.

Capping radicals are present in the SPSA component to reduce, and preferably eliminate, the silanol content of the component. In the capping radicals R can be any of said monovalent hydrocarbon radical delineated for the curing radicals; however, methyl, vinyl and phenyl are preferred and methyl is most preferred. Specific examples of suitable capping radicals include, but are not limited to, $Me_3SiO-$, $Me_2ViSiO-$ and $PhMe_2SiO-$.

Silicon-bonded radicals of the silicone pressure sensitive adhesive component which are not curing radicals or capping radicals having the formulae indicated are selected from divalent oxygen atoms linking silicon atoms and monovalent radicals selected from hydrogen atoms and the hydrocarbon radicals noted above for R.

The SPSA component of the compositions of this invention bearing curing and capping radicals can be prepared by introducing the required curing and capping radicals, in any desired sequence, into a preformed SPSA and/or into one or more of the siloxane components of the SPSA, by way of reactive sites, such as silicon-bonded hydroxyl or vinyl radicals, therein.

SPSA compositions which can be used to prepare the SPSA component of the compositions of this invention comprise (1) an organopolysiloxane resin and (2) a polydiorganosiloxane gum. The weight ratio of resin (1) to gum (2) in the SPSAs ranges from 5/95 to 70/30. preferably 40/60 to 60/40. The silicon-bonded radicals of these SPSAs are selected from the group consisting of divalent oxygen atoms linking silicon atoms, hydroxyl radicals, and monovalent hydrocarbon radicals, such as alkyl, aryl, alkenyl, cycloalkyl, cycloalkenyl, aralkyl and alkaryl; and hydrogen atoms.

The organopolysiloxane resin (1) consists essentially of $R^1_3SiO_{1/2}$ siloxane units and $SiO_{4/2}$ siloxane units and can be dissolved, substantially completely, in either a hydrocarbon liquid such as benzene, toluene, xylene, heptane and the like or in a silicone liquid such as cyclic or linear polydiorganosiloxanes.

In the $R^1_3SiO_{1/2}$ siloxane units $R^1$ denotes a monovalent hydrocarbon radical preferably having less than 20 carbon atoms, and most preferably having from 1 to 10 carbon atoms, a hydroxyl radical or a hydrogen atom.

Examples of suitable hydrocarbon $R^1$ radicals include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2-phenylethyl.

At least one-third, and more preferably substantially all $R^1$ radical, in the formula for component (1) are methyl radicals. Examples of preferred $R^1_3SiO_{1/2}$ siloxane units include $HMe_2SiO_{1/2}$, $Me_3SiO_{1/2}$, $PhMe_2SiO_{1/2}$ and $Me_2ViSiO_{1/2}$ where Me, Ph and Vi denote methyl, phenyl and vinyl.

The mol ratio of the $R^1_3SiO_{1/2}$ siloxane units to $SiO_{4/2}$ siloxane units of component (1) has a value of from 0.5/1 to 1.5/1, preferably from 0.6/1 to 0.9/1. These mol ratios are easily measured by $Si^{29}$ n.m.r. spectroscopy.

Component (1) consisting essentially of $R^1_3SiO_{1/2}$ siloxane units and $SiO_{4/2}$ siloxane units can be prepared by any suitable method. That is to say, it is believed that the organopolysiloxane resin (1) can be prepared by, for example, silane co-hydrolysis methods or silica hydrosol capping methods known in the art. Component (1) is preferably prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310; each incorporated herein to teach how to prepare organopolysiloxane resins which can be reacted to contain curing radicals or which can be used to make SPSAs which can be reacted to contain curing radicals.

Component (2) of the SPSA component to be converted to contain curing radicals is a polydiorganosiloxane gum having the general formula $R^3R^2_2SiO(R^2_2SiO)_nSiR^2_2R^3$. In this formula each $R^2$ denotes a hydrogen atom or a monovalent hydrocarbon radical and each $R^3$ denotes a radical selected from the group consisting of $R^2$ radicals and OH radicals. Examples of $R^2$ radicals include the hydrocarbon radicals delineated above for $R^1$, including preferred species.

At least 50%, and preferably at least 90%, of the $R^2$ radicals of Component (2) are methyl radicals. The methyl radicals can be distributed in any preferred manner in the polydiorganosiloxane.

General examples of polydiorganosiloxanes which are suitable for use as component (2) in the compositions of this invention include hydroxyl-. hydrogen- and hydrocarbon-terminated polydiorganosiloxanes. Specific examples of these polydiorganosiloxane include, but are not limited to, the polydiorganosiloxanes in the examples disclosed below and $HMe_2SiO(Me_2SiO)_n$-$SiMe_2H$, $ViMe_2SiO(Me_2SiO)_nSiMe_2Vi$, $ViMe_2SiO(Me_2SiO)_{0.98}$ $_n(MeViSiO)_{0.02}$ $_nSiMe_2Vi$, $Me_3SiO(Me_2SiO)_{0.9}$ $_n(MeViSiO)_{0.1}$ $_nSiMe_3$, $Me_3SiO(Me_2SiO)_{0.9}$ $_n(MeHSiO)_{0.1}$ $_nSiMe_3$, $HOMe_2SiO(Me_2SiO)_nSiMe_2OH$, and $HOR^2_2SiO(Me_2SiO)_{0.95}$ $_n(MeViSiO)_{0.05}$ $_nSiR^2_2OH$, wherein Me, Vi and Ph denote methyl, vinyl and phenyl, respectively.

The average values of the subscript n in the above formulae are such that the organopolysiloxane component (2) has a viscosity at 25° C. of from 100,000 centipoise (100 pascal-seconds) to 100,000,000 centipoise (100 kilopascal-seconds) and more. The exact value of the subscript n needed to provide a viscosity value falling within said limits depends upon the identity of the $R^2$ radicals; however, for hydroxyl-terminated and-/or $R^2$-terminated polydiorganosiloxanes containing at least 90% methyl radicals n will have a value of from one to several thousand. From a consideration of maximum adhesive properties, component (2) is preferably a gum having a viscosity of at least 1,000,000 centipoise at 25° C.

Component (2) can comprise trace amounts of siloxane branching sites, such as $R^2SiO_{3/2}$ units and $SiO_{4/2}$ units, and can be comprised of a single polydiorganosiloxane or a mixture of two or more different polydiorganosiloxanes, if desired. Polydiorganosiloxanes are well known in the organosilicone art and their synthesis needs no delineation herein. Many are commercially available from major silicone manufacturers.

SPSAs having sites of the formula $\equiv$SiOH, herein also denoted as a silanol-functional SPSA, can be any of those known in the art. The disclosures of U.S. Pat. Nos. 2,736,721; 2,814,601; 2,857,356; 3,527,842; 3,528,940; 3,839,075; 3,929,704; 3,983,298; 4,309,520; 4,584,355; 4,591,622; and 4,774,297 are incorporated herein by reference to illustrate silanol-functional SPSAs that can be used to prepare the moisture-curable SPSA component of the compositions of this invention.

SPSAs having sites of the formula $\equiv$Si-alkenyl, herein also denoted as an alkenyl-functional SPSA, can be prepared, for example, by replacing one or more of the silanol-functional components normally used to prepare a silanol-functional SPSA compositions known in the art with an alkenyl-functional component.

SPSAs having sites of the formula $\equiv$SiH, herein also denoted as a hydrogen-functional SPSA, can be prepared, for example, by replacing one or more of the silanol-functional components normally used to prepare a silanol-functional SPSA compositions known in the art with a hydrogen-functional component.

A preferred SPSA composition to be used to prepare the SPSA component of the compositions of this invention is a bodied SPSA composition. A bodied SPSA composition can be prepared by heating a solution of a silanol-functional SPSA in a solvent, such as a water-azeotroping hydrocarbon, at reflux until its silanol content has been reduced, preferably to a value of less than one weight percent.

The SPSA component of this invention which bears curing and capping radicals can be prepared by a process wherein an $\equiv$SiX-functional SPSA is reacted with a compound that will convert a desired number of $\equiv$SiX groups in the SPSA to curing radicals having the formula noted above. Any $\equiv$SiOH groups which are not converted to curing radicals must be capped with R'SiO— radicals to obtain a moisture-curable SPSA of this invention which has substantial resistance to gelling when it is stored in the absence of moisture. It should be understood that at least the polydiorganosiloxane gum or the organopolysiloxane resinous portion or the SPSA composition made therefrom must contain a sufficient number of $\equiv$SiX reactive site to accomodate the introduction of the desired number of curing radicals.

Accordingly, in a second embodiment the present invention relates to a method comprising: reacting (i) a silicone pressure sensitive adhesive composition having reactive sites of the formula $\equiv$SiX. at least one X being OH. with (ii) a moisture-reactive compound having the formula $R_b(OR')_{3-b}SiY$ wherein Y denotes a radical which is reactive with $\equiv$SiX, whereby the Y-substituted silicon atom is linked with the X-substituted silicon atom by a divalent Z radical, R denotes a monovalent hydrocarbon radical, R' denotes an alkyl or alkoxyalkyl radical, and the subscript b has a value of 0 or 1; and with (iii) a silanol-capping compound having the formula $R_3SiY'$ wherein Y' denotes a radical which is reactive with slanol, whereby the Y'-substituted silicon atom is linked with the silanol-substituted silicon atom by a divalent oxygen atom, and R denotes a monovalent hydrocarbon radical; all other silicon-bonded radicals in (i) being selected from the group consisting of divalent oxygen atoms linking silicon atoms, hydrogen atoms and monovalent hydrocarbon radicals.

Curing radicals having the formula $R_b(OR')_{3-b}SiZ$— can be introduced by any process wherein the Y radical of $R_b(OR')_{3-b}SiY$ reacts with an X radical of an X-substituted SPSA to form a Z radical, as noted above. The process for forming a Z radical can encompass the reactions of silicon chemistry, such as the reaction of silanols or of silicon hydrides; or of organic chemistry, such as the reaction of an alcohol with a carboxylic acid to form an ester linkage. Conveniently, for this purpose, one can adapt one or more of the several methods which are disclosed in the art for preparing moisture-curable silicone elastomers and/or sealants and U.S. Pat. Nos 3,122,522; 3,161,614 (Re 29,760); 3,175,993; 3,334,067; 4,100,129; 4,395,526; 4,599,394; 4,772,675; 4,847,400; and 4,962,174 are incorporated herein by reference to show the preparation of moisture-curable compositions which comprise silicon-bonded alkoxy groups and a catalyst.

In particular the disclosures of Weyenberg, U.S. Pat. No. 3,175,993; Lucas, U.S. Pat. No. 4,599,394; Klosowski and Meddaugh, U.S. Pat. No. 4,772,675: Krahnke and Saam, U.S. Pat. No. 4,847,400: and Bilgrien and Berg, U.S. Pat. No. 4,962,174 are recommended for synthesis methods that can be adapted for the preparation of the SPSA component bearing silicon-bonded curing radicals having the formula formula $Me_b(MeO)_{3-b}SiC_2H_4SiMe_2(OSiMe_2)_yD$— wherein y has an average value of from 0 to 6. preferably 0 to 1. each both inclusive.

The SPSA component bearing curing radicals can be prepared by the application of any of the above-noted processes to SPSA compositions and/or to one or more of their several components. Briefly, these methods comprise hydrosilylation reactions and silanol-converting reactions; the latter comprising the reaction of a silanol group with a silicon-bonded hydrolyzable radical such as amine, silylamine, alkoxy, halogen or acyloxy; or with a silicon-bonded hydrogen atom.

For example, $(MeO)_3SiCH_2CH_2$— radicals and $(MeO)_3SiCH_2CH_2SiMe_2OSiMe_2CH_2CH_2$— radicals can be introduced into a vinyl radical-containing SPSA component with compounds having the formula $(MeO)_3SiH$ and $(MeO)_3SiCH_2CH_2SiMe_2OSiMe_2H$, respectively. In this example Y=H or $CH_2CH_2SiMe_2OSiMe_2H$, respectively, and $X=CH_2=CH-$.

Radicals having the formulae $(MeO)_3SiO$— and $Me(MeO)_2SiO$— can be introduced into a silanol-functional SPSA component with compounds having the formulae $(MeO)_4Si$ and $Me(MeO)_3Si$, respectively. Alternatively, compounds having the formulae $(MeO)_3SiH$ and $Me(MeO)_2SiH$, respectively, can be used. In these examples Y=MeO— or H, respectively, and X=OH.

$(MeO)_3SiCH_2CH_2SiMe_2O$—, $(MeO)_3SiCH_2CH_2SiMe_2OSiMe_2O$— and $(MeO)_3SICH_2CH_2SiMe_2CH_2CH_2SiMe_2O$— radicals can be introduced into a silanol-functional SPSA component by the use of compounds such as $(MeO)_3SiCH_2CH_2SiMe_2OSiMe_2H$, $(MeO)_3SiCH_2CH_2SiMe_2CH_2CH_2SiMe_2H$ and $(MeO)_3SiCH_2CH_2SiMe_2H$.

Most conveniently, curing radicals having the formula $R_b(OR')_{3-b}SiZ$— are introduced by reacting a silanol-containing SPSA with a moisture-reactive compound having the formula $R_b(OR')_{3-b}SiY$ wherein Y bears a silicon-bonded hydrolyzable radical such as halogen, acyloxy, amino, amido, etc. In view of the type of by-products that are produced during the reaction Y preferably bears an amino nitrogen which provides an ammonia by-product.

Silazanes and disilazanes are preferred compounds for introducing the curing radicals into a silanol-functional SPSA, in view of the type of by-products that will be produced during the reaction. Examples of silazanes and disilazanes include $(MeO)_3Si(CH_2CH_2SiMe_2)_x(OSiMe_2)_yNH_2$ and $\{(MeO)_3Si(CH_2CH_2SiMe_2)_x(OSiMe_2)_y\}_2NH$, such as $\{(MeO)_3SiCH_2CH_2SiMe_2\}_2NH$. A highly preferred curing radical for the composition of this invention is $(MeO)_3SiC_2H_4SiMe_2O$— because it can be readily introduced into the SPSA composition by way of a disilazane.

The SPSA component bearing silicon-bonded curing radicals having the formula $R_b(OR')_{3-b}SiZ$— can bear any number of curing radicals; the rate and extent of cure of the SPSA composition, when exposed to moisture, being dependent on the concentration of curing radicals.

It is believed at this time that the SPSA component should contain an average of at least 1 millimol, preferably at least 2 millimols, of curing radicals per 100 parts by weight of SPSA component to obtain a desirable rate of cure. On the other hand it is currently believed that the SPSA component should contain no more than 100, preferably no more than 50, millimols of curing radicals per 100 parts of SPSA component to achieve a desirable adhesive strength. Of course, mols and parts are to be expressed in comparable terms. For example, 5 millimols and 100 parts can be expressed as 5 milligram-mols and 100 gram parts or as 5 millipound-mols and 100 pound parts.

Capping radicals having the formula $R_3SiO$— can be introduced into the SPSA component by any process wherein the Y' radical of $R_3SiY'$ reacts with a silanol radical of a silanol-substituted SPSA to form a siloxane linkage, as noted above. Briefly, these processes comprise the reaction of a compound bearing a a silicon-bonded hydrolyzable radical such as amine, amido, silylamine, halogen or acyloxy; or with a silicon-bonded hydrogen atom.

For example, radicals having the formulae $Me_3SiO$— can be introduced into a silanol-functional SPSA component with compounds having the formulae $Me_3SiCl$, $Me_3SiOCOCH_3$, $Me_3SiH$, $Me_3SiN(CH_3)COCH_3$, $(Me_3Si)_2NCOCH_3$, $Me_3SiNH_2$, $(Me_2Si)_2NH$.

In view of the type of by-products that are produced during the reaction Y' preferably bears an amino nitrogen which provides an ammonia by-product, such as with silazanes and disilazanes, such as $Me_3SiNH_2$ and $(Me_3Si)_2NH$. The disclosure of U.S. Pat. No. 3.527.659 is incorporated herein to teach a preferred method for capping silicon-bonded hydroxyl radicals.

The SPSA component can bear any number of capping radicals, provided the number is sufficient to cap a significant number, preferably substantially all, of the silanols in the SPSA component. By a significant number of silanols it is meant a number sufficient to provide improved shelf-stability for the composition. It is currently believed that substantially no silanols should remain unreacted in the SPSA component in order to obtain maximum shelf-life.

A suitable reaction catalyst should be used when introducing curing and capping radicals into the SPSA component. For example, when using a silicon hydride it is desirable to use a platinum group metal catalyst such as platinum or rhodium and its compounds and complexes to accelerate the hydrosilylation reaction. When using a silazane it is desirable to use a strong acid catalyst such as trifluoroacetic acid. In certain instances this reaction catalyst can be the same as the curing catalyst, noted above. For example, when using an alkoxysilane to introduce curing radicals it is desirable to use a titanate catalyst, such as tetrabutyl titanate.

In addition to a SPSA component bearing silicon-bonded curing radicals the compositions of this invention preferably further comprise an effective amount of a catalyst component to accelerate the reaction of the curing radicals with moisture to form siloxane bonds.

Catalysts for accelerating the reaction of the OR, radicals with moisture to form siloxane bonds are well known in the silicone elastomer art and need no detailed delineation herein. Briefly, said catalysts include, but are not limited to, metal salts of monocarboxylic acids, such as stannous octoate, dibutyltin dilaurate and dibutyltin diacetate; titanium esters, such as tetrabutyl titanate, tetraethylhexyl titanate and tetraphenyltitanate;

siloxytitanates, such as tetrakis(trimethylsiloxy)titanium and bis(trimethylsiloxy)-bis(isopropoxy)titanium; and betadicarbonyltitanium compounds, such as bis-(acetylacetonyl)diisopropyl titanate; amines, such as hexylamine; and their acetate and quat salts.

Preferred catalysts are bis(acetylacetonyl)diisopropyl titanate and certain orthotitanates, such as tetrabutyl titanate, and their partial hydrolyzates. The amount of titanium-containing catalysts typically ranges from 0.1 to 2%, based on the weight of the SPSA component.

The compositions of this invention can be prepared by introducing curing and capping radicals of the formulae noted above into a SPSA component, preferably in solution, and thereafter admixing a suitable amount of the catalyst component, if desired. The solvent component can be any liquid that will dissolve the SPSA precursor and the curing radical-containing SPSA component without adversley reacting therewith in the absence of moisture. Examples of suitable solvents include aromatic hydrocarbons, such as benzene, toluene and xylene; aliphatic hydrocarbons, such as hexane, heptane and cyclohexane; halogenated hydrocarbons such as chlorocarbons; oxygenated solvents such as esters, ketones and lower alcohols; and volatile siloxanes such as hexamethyldisiloxane and cyclopolydimethylsiloxanes.

The compositions of this invention typically, but not necessarily, further comprise an appropriate quantity of a solvent to provide a lower viscosity for, and hence an easier application of, the SPSA composition to various substrates. The amount of solvent is not critical; however, only a sufficient amount to facilitate the preparation, handling and applying of the composition is recommended. The solvent, when used, is preferably used in an amount sufficient to provide a viscosity of from 10,000 to 100,000 centipoise at 25° C. for the composition.

Concrete examples of this component are the same as those delineated above for use during the preparation of the SPSA component and mixtures thereof. The solvent, when used, is preferably a non-reactive hydrocarbon solvent or siloxane solvent. It has been found convenient, but not necessary, to prepare the SPSA component in a solvent that can be allowed to remain in the final composition as a viscosity-adjusting solvent.

The compositions of this invention can be used in all of the applications to which the SPSA compositions of the art are directed since they possess adhesive properties in their uncured state, one or more of which will improve upon exposure to ambient moisture. Additionally, the compositions of this invention can be used in all of the applications to which the permanent adhesive compositions of the art are directed since certain embodiments thereof will cure to the permanent adhesive state upon exposure to ambient moisture. It is expected that the compositions of this invention will be recognized as being useful for novel applications in view of their moisture-activated curing capability.

Typically, the use of the compositions of this invention comprises applying the composition to a substrate: removing substantially all of the solvent from the applied composition to provide an adhesive-bearing substrate; and adhering the adhesive-bearing substrate to a surface. Optionally, one can expose the adhesive on the adhered substrate to moisture to improve one or more adhesive properties selected from tack, peel adhesion, tensile adhesion, adhesive failure mode, yield modulus, modulus at cohesive failure, etc.

The solvent-containing compositions of this invention, whether catalyzed or uncatalyzed, can be stored in the absence of moisture for extended periods of time without experiencing any substantial gelling. Accordingly, they can be prepared months prior to being applied to a substrate. Thereafter it is preferred to apply the adhesive-bearing substrate to the surface before the adhesive has experienced a complete loss of tack. It is recommended that the adhesive-bearing substrate be applied to the surface within a few days to a few weeks after being prepared. If there is any delay in applying the adhesive-bearing substrate to the surface it is recommended to maintain the adhesive under substantially anhydrous conditions until it has been applied.

The substrate and surface can have any solid form and can comprise any material. Examples of suitable forms include decorative articles, devices and mechanical parts in elastomer, foam, flexible or rigid consistency. Examples of suitable materials include ferrous and non-ferrous metals, such as aluminum, iron, copper, tin, silver, gold, platinum and their several alloys; synthetic polymeric materials, such as polyolefins, polyesters, polyamides, polyacrylates, polyfluoroolefins and polysiloxanes; cellulosic materials, such as paper and wood; textile materials, such as cotton and its blends; and siliceous materials, such as glass, cement, concrete, brick, ceramic, porcelain, china, quartz and crystal.

The following disclosure is to illustrate, but not limit, the present invention, which is properly delineated by the appended claims. Unless stated otherwise, all ratios, parts and percentages are by weight and temperatures are in degrees Celsius.

Measurement of Peel Adhesion and Tack

Unless otherwise stated, a 50% solution of SPSA was cast onto 2-mil Mylar(R). drawn down with a 3 mil bird bar (Gardner Pacific) and the film was heated at 70° for 3 minutes to remove volatile material and provide a dry adhesive thickness of 1.5 mils.

Peel adhesion (Adh) of a SPSA was measured by applying a 6"×1" strip of the Mylar-backed adhesive to a clean 2"×6" stainless steel panel using two passes of a 2 kg rubber-coated roller. The force required to remove the tape therefrom was measured with a Keil Tester at a peel angle of 180° at a rate of 12 inches/minute. The values recorded are the average of multiple readings taken during the course of one pull per sample. The Keil Tester is described in TAPPI, vol. 43. No. 8. pages 164A and 165A (August 1960).

Tack was measured on 6-1" squares of the Mylar-backed adhesive using a POLYKEN (R) brand probe tack tester (Testing Machines, Inc.; Amityville, N.Y.). The test procedure used a 20 gram weight, a dwell time of 0.5 seconds and a pull speed of 0.5 cm/sec, and the results are the average of the six readings expressed in units of grams.

Measurement of Tensile Adhesion

Tensile Adhesion (TA) was measured in accordance with ASTM C 1135-90, "Standard Test Method for Determining Tensile Adhesion of Structural Sealants", except as follows: the test specimens were conditioned at 23° C. for 0, 3, 7, 14, 30, 60 and 90 days, in addition to the 21 days required by ASTM C 1135-90; and the test specimens were assembled with an adhesive-bearing core of cured silicone rubber, rather than a solid plug of sealant of the same size which was cured in contact with the glass panels.

Core #1 was one-half of a honeycombed extrusion of silicone rubber having a durometer of 70 and dimensions of 1"h×½"w×2"l and having 17 cylindrical holes. 3/32" i.d.×2"l, arranged in three columns of 6, 5 and 6 holes, evenly spaced. The extrusion was cut in half along its width to produce the core having dimensions of ½"h×½"w×2"l and having 8 cylindrical holes in the body of the core and 1 semi-cylindrical groove along one non-bonding surface of the core, each having dimensions of ⅛" i.d.×2"l. The bonding surfaces were adjacent to the groove-bearing surface.

Core #2 was an extrusion of cured silicone rubber having a durometer of 70, and a "cinder block form" cross section with dimensions of ⅜"h×½"w×2"l and the 2 rectangular holes having dimensions of ¼"h×3/32"w×2"l. The bonding surfaces of the core were the opposing ½" wide surfaces.

The adhesive-bearing cores were prepared by one of two methods, i.e., the Core Coating method or the Transfer Film method.

In the core coating method a solution of SPSA was applied to both bonding surfaces of the core of silicone rubber, at a wet thickness of 10 mils, and devolatilized at 70° C. to provide the adhesive-bearing core. To assemble the test specimen the exposed adhesive surfaces were adhered to the 1"×3" panels of the test specimen.

In the transfer film method a solution of SPSA was applied to a release liner in a wet thickness of 10 mils, unless stated otherwise, and the applied solution was devolatilized at 70° C. for 5 minutes. To assemble the adhesive-bearing core the devolatilized SPSA. with its release liner, was adhered to one bonding surface of the silicone rubber core. The process was repeated on the other bonding surface of the core. To assemble the test specimen the liners were removed from the transferred adhesive and the exposed adhesive surfaces were adhered to the 1"×3" panels of the test specimen.

Measurement of Liner Release and Subsequent Adhesion and Tack

Liner Release (Rel) was determined by cutting a laminate, consisting of SPSA cast onto a Mylar-backed fluorosilicone release coating and laminated to 2-mil Mylar backing, into 1 inch wide strips and pulling the laminate apart at the adhesive/release coating interface at a rate of 12 inches/minute using a Keil Tester, noted above.

Subsequent Adhesion (SA) was measured as noted above for peel adhesion, except using an adhesive that had been removed from a fluorosilicone release liner. SA is expressed in units of ounces/inch. oz/in.

Subsequent Tack (ST) was measured as noted above for the measurement of tack, except using an adhesive that had been removed from a fluorosilicone release liner. ST is expressed in units of grams.

Materials

TBT—Tetrabutyl titanate.
HMDZ—Hexamethyldisilazane.
TFAA—Trifluoroacetic acid.
ETMDZ(C)—A reaction mixture of 15.6% non-silazane materials comprising 5% starting materials and 10.6% $\{(MeO)_3SiCH_2\}_2$; 79.8% silazane materials comprising 10.6% $\{(MeO)_3SiC_2H_4SiMe_2N-HSiMe_2CH_2\}_2$, 69.2% $\{(MeO)_3SiC_2H_4SiMe_2\}_2NH$; and 4.6% unidentified products: prepared by adding tetramethyldisilazane to a mixture of vinyltrimethoxy silane and chloroplatinic acid complexed with divinyltetramethyldisiloxane.

ETMDZ(F)—Substantially pure $\{(MeO)_3SiC_2H_4SiMe_2\}_2NH$, prepared by fractionating ETMDZ(C).

ETMDZ(D)—A mixture of 11.6% non-silazane materials comprising 1.4% unidentified by-products and 10.2% $\{(MeO)_3SiCH_2\}_2$, and 88.4% silazane materials comprising 1.8% $\{(MeO)_3SiC_2H_4SiMe_2N-HSiMe_2CH_2\}_2$ and 86.5% isomers having the formula $\{(MeO)_3SiC_2H_4SiMe_2\}_2NH$; prepared by distilling ETMDZ(C).

ETMSH—A mixture of $(MeO)_3SiC_2H_4SiMe_2OSiMe_2H$, 96%; 2% vinyltrimethoxy silane and 2% tetramethyldisiloxane, prepared by adding vinyltrimethoxy silane to a mixture of tetramethyldisiloxane and chloroplatinic acid complexed with divinyltetramethyldisiloxane and distilling the reaction product.

Polymer A—A hydroxyl-terminated polydimethylsiloxane gum having a plasticity number of 137–152. as measured by ASTM 926-67, and a viscosity of at least 10,000,000 centipoise at 25°.

Polymer B—A hydroxyl-terminated polydimethylmethylvinylsiloxane gum having 4 mol % vinyl-containing siloxane units, a plasticity number of 137–152, as measured by ASTM 926-67. and a viscosity of at least 10,000,000 centipoise at 25°.

Solution A—A xylene solution containing 70% of a soluble organopolysiloxane consisting of $(CH_3)_3SiO_{1/2}$ units and $SiO_{4/2}$ units in a mol ratio of 0.8/1 and having a hydroxyl content of 3.45% and $M_n=1,963$, $M_v/M_n=2.57$ as measured by gel-permeation chromatography using Varian TSK 4000+2500 columns at 35°, a chloroform mobile phase at 1 mL/m and an IR detector set at 8.5 microns to detect $SiO_2$. Polystyrene standards were used for linear regression calibrations.

Solution B—A SPSA composition having a silicon-bonded hydroxyl content of 0.45% and containing 45% xylene and volatile siloxanes and 55% of a bodied SPSA consisting of 55% of the organopolysiloxane resin of Solution A and 45% of OH— endblocked polydimethylsiloxane gum having a plasticity of about 60.

EXAMPLES 1–5

A mixture of 86.2 parts Polymer B, 126 parts Solution A and 82 parts toluene was heated at reflux (124°) for 3 hours to body the SPSA. To cap all residual silanols 4.8 parts of HMDZ was added to the reaction mixture and refluxing was continued for one hour. Five portions of the bodied and capped SPSA were separated and treated with either 3.59% (Examples 1 and 2) or 5.52% (Examples 3–5) of ETMSH. based on SPSA solids to convert vinyl radicals to curing radicals. One part of platinum catalyst per 100 parts of ETMSH was added and the mixture was allowed to stand at room temperature overnight. The material of Examples 1, 4 and 5 gell in the vial after five days at room temperature. The material of Examples 2 and 3 did not gelled in the vial before forty days at room temperature.

The five compositions were used to make adhesive films by Method 1 (Example 1) and Method 2 (Example 2–5). Method 1 consisted of casting the composition on a backing and evaporating the solvent. i.e., no moisture-curing catalyst was used. Method 2 was the same as Method 1, except a percentage of TBT catalyst, based on SPSA solids, was used as a moisture-curing catalyst.

The results of the tack and adhesion measurements, taken on the solvent-free adhesive film after various amounts of exposure to atmospheric moisture are listed in Table I.

EXAMPLES 6–9

A mixture of 172.3 parts Polymer B, 251.9 parts Solution A and 175.8 parts toluene was heated at reflux (124°) for 3 hours to body the SPSA. Two 179 part portions of the bodied SPSA solution were separated for capping with HMDZ under two processes. In the room temperature capping process (Examples 6 and 7) a mixture of 4.59 parts of HMDZ and 0.36 parts of TFAA was mixed with one of the portions and the mixture was allowed to react at room temperature over the weekend. In the high temperature capping process (Examples 8 and 9) a mixture of 4.59 parts of HMDZ and 0.36 parts of TFAA was mixed with one of the portions and the mixture was heated at 110° for 1 hour. A portion of each of the bodied and capped SPSA solutions was separated and treated at room temperature with 5.81% of ETMSH and 0.06% platinum catalyst, both percentages based on SPSA solids, to convert vinyl radicals to curing radicals. The materials did not gell in the vial after three days at room temperature. The compositions were used to make adhesive films by Method 1 (Example 6 and 8) and Method 2 (Examples 7 and 9), noted above. The results of the tack and adhesion measurements, taken on the solvent-free adhesive film after various amounts of exposure to atmospheric moisture are listed in Table I.

All compositions are experiencing changes in adhesive properties and are appearing to cure to a tackless SPSA.

dissolved in Solution B and the solutions were heated at 100° for about one hour to convert the percentage of SPSA silanols to $(MeO)_3SiC_2H_4Si(Me_2)O-$ curing radicals as indicated in Table II to provide Comparison Examples i, ii and iii. Examples 10, 11 and 12 were prepared by taking portions of the comparison examples, cooling the portions to 60° and adding 1 mol of HMDZ per mol of SiOH originally present in Solution B and heating the reaction mixtures at 100° for an additional hour to cap any remaining silanols of the adhesive to unreactive trimethylsiloxy groups.

The six resulting compositions containing approximately 40–50% solvent were catalyzed with 1% TBT, based on solution weight and the catalyzed compositions were tested for tack and peel adhesion (Table II), liner release, subsequent peel adhesion and subsequent tack (Table III) and tensile adhesion (Table IV) in accordance with the methods described above. Core #1 was used to obtain the tensile adhesion data. The uncatalyzed compositions were similarly tested, except omitting tensile adhesion testing.

The core coating specimens of Comparison Example i and Example 12 were also subjected to 90 TA day testing. Those results are summarized in Table IX.

Tables IV and IX show that the compositions of this invention are sufficiently strong, initially and after 90 days exposure to ambient moisture, to be useful as a structural glazing adhesive when applied either directly to the tape core or transferred to the tape core as an adhesive film. Contrastingly, the control composition (i) is not sufficiently strong, initially or after 4 days exposure to ambient moisture, to be useful as a structural glazing when applied by either the direct or transfer manner.

TABLE I

| Ex-ample | ETMSH* | TBT | 1 Day Tack | 1 Day Adh | 7 Days Tack | 7 Days Adh | 21 Days Tack | 21 Days Adh |
|---|---|---|---|---|---|---|---|---|
| 1 | 7 | 0% | 824 | 39 | 1245 | 50 | 988 | 42 |
| 2 | 7 | 1% | 1175 | 49 | 806 | 42 | 659 | 34 |
| 3** | 11 | 1% | 862 | 43 | 715 | 39 | 601 | 27 |
| 4** | 11 | 2% | 840 | 45 | 707 | 34 | 465 | 24 |
| 5** | 11 | 5% | 795 | 47 | 542 | 40 | 285 | 19 |
| 6*** | 21 | 0% | 648 | 17 | 470 | 11 | 430 | 7 |
| 7*** | 21 | 1% | 614 | 16 | 294 | 3 | 242 | 2 |
| 8*** | 21 | 0% | 351 | 14 | 511 | 8 | 430 | 4 |
| 9*** | 21 | 1% | 439 | 11 | 140 | 2 | — | — |

*Millimols per 100 parts of SPSA
**0 and 5 day data, instead of 1 and 7 data day.
***0 and 14 day data, instead of 1 and 21 day data.

EXAMPLES 10–12

Under a dry nitrogen sweep appropriate amounts (listed in Table III) of ETMDZ(D) and TFAA were

TABLE II

| Ex | Disilazane, M%* Curing | Disilazane, M%* Capping | 0 Days Tack | 0 Days Adh | 7 Days Tack | 7 Days Adh | 21 Days Tack | 21 Days Adh |
|---|---|---|---|---|---|---|---|---|
| i | 10 | 0 | 929 | 47 | 1014 | 53 | 647 | 49 |
| 10 | 10 | 100 | 1200 | 49 | 975 | 26 | 641 | 52 |
| ii | 20 | 0 | 336 | 39 | 210 | 28 | 25 | 26 |
| 11 | 20 | 100 | 663 | 20 | 544 | 51 | 278 | 33 |
| iii | 25 | 0 | 248 | 2 | 0 | 5 | 0 | 1 |
| 12 | 25 | 100 | 685 | 20 | 499 | 28 | 230 | 16 |
| i** | 10 | 0 | 1097 | 35 | 958 | 48 | 633 | 51 |
| 10** | 10 | 100 | 1170 | 45 | 914 | 58 | 807 | 58 |
| ii** | 20 | 0 | 1092 | 38 | 874 | 44 | 663 | 50 |
| 11** | 20 | 100 | 1013 | 29 | 448 | 42 | 306 | 47 |
| iii** | 25 | 0 | 803 | 21 | 560 | 30 | 360 | 30 |
| 12** | 25 | 100 | 982 | 34 | 432 | 29 | 303 | 42 |

*Mols of disilazane per mol of silanol in the SPSA.
**Composition not catalyzed.

TABLE III

| Ex | % OH Conv | Amount, gram ETMDZ | Amount, gram HMDZ | 0 Days ST | 0 Days SA | 0 Days Rel | 7 Days ST | 7 Days SA | 7 Days Rel | 21 Days ST | 21 Days SA | 21 Days Rel |
|---|---|---|---|---|---|---|---|---|---|---|---|---|
| i | 20 | 0.917 | — | 895 | 44 | 30 | 574 | 42 | 150 | 341 | 31 | 180 |
| 10 | 100 | 0.920 | 8.61 | 1099 | 43 | 5 | 981 | 42 | 30 | 812 | 42 | 50 |
| ii | 40 | 1.839 | — | 430 | 39 | 20 | 346 | 39 | 35 | 231 | 31 | 50 |
| 11 | 100 | 1.837 | 8.56 | 686 | 24 | 0 | 582 | 13 | 30 | 469 | 31 | 30 |
| iii | 50 | 2.298 | — | 371 | 6 | 0 | 167 | 2 | 35 | 44 | 23 | 45 |
| 12 | 100 | 2.298 | 8.51 | 728 | 26 | 0 | 631 | 24 | 30 | 487 | 42 | 35 |
| i* | 20 | 0.917 | — | 1113 | 36 | 20 | 1014 | 41 | 3 | 769 | 46 | 25 |
| 10* | 100 | 0.920 | 8.61 | 1166 | 39 | 25 | 976 | 52 | 11 | 500 | 46 | 35 |
| ii* | 40 | 1.839 | — | 957 | 37 | 20 | 816 | 38 | 12 | 436 | 26 | 160 |
| 11* | 100 | 1.837 | 8.56 | 967 | 30 | 20 | 879 | 38 | 20 | 726 | 45 | 25 |
| iii* | 50 | 2.298 | — | 947 | 27 | 20 | 700 | 32 | 34 | 82 | 7 | 280 |
| 12* | 100 | 2.298 | 8.51 | 1068 | 30 | 25 | 841 | 41 | 20 | 506 | 45 | 30 |

*Composition not catalyzed.

TABLE IV

| Ex | 0 Days TA, psi | 3 Days TA, psi | 7 Days TA, psi | 14 Days TA, psi | Comments |
| --- | --- | --- | --- | --- | --- |
| i | 71.8 | 84.7 | 105.0 | 96.9 | Core coating |
| 10 | 48.8 | 62.2 | 74.1 | 74.1 | Core coating |
| ii | 71.5 | — | 62.4 | 44.3 | Core coating |
| 11 | 67.3 | 88.0 | 101.9 | 113.0 | Core coating |
| iii | 67.8 | 89.3 | 82.4 | 80.6 | Core coating |
| 12 | 70.7 | 82.5 | 104.4 | 147.6 | Core coating |
| i* | 40.5 | 52.0 | 58.6 | 54.2 | Core coating |
| ii* | 63.2 | 71.6 | 71.1 | 70.3 | Core coating |
| iv* | 29.6 | 56.5 | 51.0 | 54.6 | Core coating |
| i | 71.0 | — | 78.6 | 90.4 | Transfer film |
| 10 | 54.0 | 67.4 | 74.3 | 63.2 | Transfer film |
| 11 | 80.1 | 65.6 | 78.5 | 90.9 | Transfer film |
| iv* | 35.6 | 49.1 | 34.2 | 44.1 | Transfer film |

*Composition not catalyzed: iv = Adhesive from Solution B.

EXAMPLES 13-17

Solution A and Polymer A were mixed in five different ratios and the five mixtures were heated for 5 hours at reflux and then cooled to 80°-100°, whereupon 8.15% of ETMDZ(C) and 0.36% of TFAA. each amount based on adhesive solids, were added to convert 60% of the adhesive silanols to curing radicals and the mixtures were heated at 100° for 1 hour. The reaction mixtures were again cooled to 80-100° and 6.9%. based on solids, of HMDZ was added to cap the remaining adhesive silanols and the mixtures again heated at 100° for 1 hour.

The resulting compositions of this invention containing approximately 45-50% solvent were catalyzed with 1% TBT, based on solids, and the catalyzed compositions were tested for tack, peel adhesion, subsequent peel adhesion, subsequent tack and liner release (Table V) and tensile adhesion (Table VI) in accordance with the methods described above. Core #1 was used to obtain the tensile adhesion data.

The core coating specimen of Example 16 was also subjected to 90 TA day testing. Those results are summarized in Table IX.

Table VI shows that the compositions of this invention having various resin/polymer ratios are sufficiently strong, initially and after 90 days exposure to ambient moisture, to be useful as a structural glazing adhesive when applied either directly to the tape core or transferred to the tape core as an adhesive film.

TABLE V

| | | Initial Properties | | | | |
| --- | --- | --- | --- | --- | --- | --- |
| Ex | R/P | Tack | Adh | Rel | ST | SA |
| 13 | 50/50 | 732 | 46 | 40 | 823 | 46 |
| 14 | 52/47 | 422 | 43 | 25 | 729 | 49 |
| 15 | 55/45 | 562 | 45 | 30 | 643 | 49 |
| 16 | 57/42 | 643 | 43 | 25 | 735 | 48 |
| 17 | 60/40 | 578 | 38 | 25 | 806 | 47 |

TABLE VI

| Ex | 0 Days TA, psi | 3 Days TA, psi | 7 Days TA, psi | 14 Days TA, psi | Comments |
| --- | --- | --- | --- | --- | --- |
| 13 | 67.6 | 107.4 | 106.7 | 121.8 | Core coating |
| 14 | 49.7 | 137.6 | 114.8 | 137.7 | Core coating |
| 15 | 60.8 | 149.4 | 142.3 | 143.4 | Core coating |
| 16 | 76.6 | 142.8 | 115.5 | 121.3 | Core coating |
| 17 | 94.8 | 121.3 | 115.0 | 118.8 | Core coating |
| 15 | 82.0 | 118.3 | 102.4 | 122.6 | Transfer film |
| 17 | 62.0 | 101.4 | 128.4 | 100.5 | Transfer film |

EXAMPLES 18-20

The composition of Example 15 was prepared from two lots of resin, either ETMDZ(C) or ETMDZ(F) and under three reaction conditions. All composition were prepared according to the process used in Example 15 except the ETMDZ(C) and HMDZ were added at 100° in Example 18 and the order of addition for ETMDZ(C) and HMDZ were reversed in Example 20. The ETMDZ(C) and Solution A for Example 18 were the same as that used in Example 15. ETMDZ(F) was used for Example 19. The ETMDZ(C) for Example 20 was 72% pure. Examples 19 and 20 used the same resin. Tables VII and VIII list the adhesive properties of these compositions. The core coating and adhesive transfer specimens of Example 18 was also subjected to 90 day tensile adhesion testing. Those results are summarized in Table IX.

TABLE VII

| | Amount of Reactants, parts | | | | Initial Properties | | | | |
| --- | --- | --- | --- | --- | --- | --- | --- | --- | --- |
| Ex | Resin | Gum | ETMDZ | TFAA | HMDZ | Tack | Adh | Rel | ST | SA |
| 18 | 130.71 | 75.0 | 13.45 | 0.6 | 11.39 | — | — | — | — | — |
| 19 | 130.06 | 81.2 | 9.10 | 0.6 | 11.39 | 725 | 44 | 50 | 443 | 19 |
| 20 | 130.06 | 81.2 | 12.64 | 0.6 | 2.28 | 922 | 45 | 39 | 473 | 32 |

TABLE VIII

| Ex | 0 Days TA, psi | 3 Days TA, psi | 7 Days TA, psi | 14 Days TA, psi | Comments |
| --- | --- | --- | --- | --- | --- |
| 18 | 87.0 | 131.0 | 127.7 | 156.3 | Core coating |
| 18 | 90.7 | 119.0 | 119.3 | 135.7 | Transfer film |
| 19 | 120.0 | 147.0 | — | 183.8 | * |
| 20 | 128.0 | 171.6 | — | 199.5 | * |

*Transfer film made from 20 mil thick wet adhesive. Core #2 was used.

TABLE IX

| Aging | Ex. i TA, psi | Ex. 12 TA, psi | Ex. 15 TA, psi | Ex. 18 TA, psi | Ex. 18* TA, psi |
| --- | --- | --- | --- | --- | --- |
| 0 Days | 59.0 | 60.8 | 74.0 | 65.3 | 96.9 |
| 3 Days | — | 109.9 | 109.0 | 102.2 | 95.0 |
| 7 Days | 80.4 | 99.7 | 115.7 | 106.6 | 115.0 |
| 14 Days | 104.2 | 127.0 | 124.9 | 115.2 | 134.6 |
| 21 Days | 98.8 | 136.3 | 138.9 | 117.0 | 130.6 |
| 30 Days | 99.5 | 137.0 | 154.0 | 127.9 | 131.2 |
| 60 Days | 118.3 | 143.7 | 173.4 | 149.5 | 175.8 |
| 90 Days | 105.5 | 154.0 | 150.3 | 135.4 | 161.1 |

*Test specimen was from a transfer film made from a 20 mil wet coat.

That which is claimed is:

1. A method comprising: reacting (i) a silicone pressure sensitive adhesive composition having reactive sites of the formula ≡SiX and X denotes an alkenyl radical, a hydroxyl radical or a hydrogen atom, substantially all X being OH, with (ii) a moisture-reactive compound having the formula $R_b(OR')_{3-b}SiY$ wherein Y denotes a radical which is reactive with ≡SiX, whereby the Y-substituted silicon atom is linked with the X-substituted silicon atom by a divalet Z radical, R denotes a monovalent hydrocarbon radical, R' denotes an alkyl or alkoxyalkyl radical, and the subscript b has a value of 0 or 1; and with (iii) a silanol-capping compound having the formula $R_3SiY'$ wherein Y' denotes a radical which is reactive with silanol, whereby the Y'-substituted silicon atom is linked with the silanol-substituted silicon atom by a divalent oxygen atom, and R denotes a monovalent hydrocarbon radical; all other silicon-bonded radicals in (i) being selected from the group consisting of divalent oxygen atoms linking silicon atoms, hydrogen atoms and monovalent hydrocarbon radicals; the moisture-reactive compound and the silanol-capping compound comprise disilazanes and said reacting is promoted by the action of an acid catalyst.

2. A method in accordance with claim 1 wherein the silicone pressure sensitive adhesive component is prepared by bodying a mixture of (1) 40 to 60 parts by weight of an organopolysiloxane resinous portion comprising $Me_3SiO_{\frac{1}{2}}$ siloxane units and $SiO_{4/2}$ siloxane units, wherein the mol ratio of the $Me_3SiO_{\frac{1}{2}}$ siloxane units to $SiO_{4/2}$ siloxane units has a value of from 0.6/1 to 0.9/1 and (2) 40 to 60 parts by weight of a polydimethylsiloxane gum having a viscosity at 25° C. of at least 1,000,000 centipoise.

3. A method in accordance with claim 2 wherein the moisture-reactive compound comprises $\{(MeO)_3SiC_2H_4SiMe_2\}_2NH$, prepared by adding tetramethyldisilazane to a mixture of vinyltrimethoxy silane and chloroplatinic acid complexed with divinyltetramethyldisiloxane and allowing a hydrosilylation reaction to occur; the silanol-capping compound has the formula $(Me_3Si)_2NH$ and Me denotes the methyl radical.

4. A method in accordance with claim 3 wherein the amount of moisture-reactive compound is sufficient to react with from 2 to 50 millimols of said silicon-bonded hydroxyl radicals in every 100 parts by weight of silicone pressure sensitive adhesive composition having reactive sites.

5. A method in accordance with claim 4 further comprising the use of a solvent component for component (i) during said reacting.

6. A method in accordance with claim 5 further comprising mixing an effective amount of a catalyst component to accelerate the reaction of the curing radicals with moisture to form siloxane bonds.

7. A composition obtained by the method of claim 3.

8. A composition obtained by the method of claim 4.

9. A composition obtained by the method of claim 5.

10. A composition obtained by the method of claim 6.

* * * * *